US011327630B1

(12) United States Patent
Khan et al.

(10) Patent No.: US 11,327,630 B1
(45) Date of Patent: May 10, 2022

(54) DEVICES, METHODS, SYSTEMS, AND MEDIA FOR SELECTING VIRTUAL OBJECTS FOR EXTENDED REALITY INTERACTION

(71) Applicants: Taslim Arefin Khan, Scarborough (CA); Szu Wen Fan, Markham (CA); Changqing Zou, Markham (CA); Wei Li, Markham (CA)

(72) Inventors: Taslim Arefin Khan, Scarborough (CA); Szu Wen Fan, Markham (CA); Changqing Zou, Markham (CA); Wei Li, Markham (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/167,764

(22) Filed: Feb. 4, 2021

(51) Int. Cl.
*G06F 3/0481* (2013.01)
*G06T 19/00* (2011.01)
(Continued)

(52) U.S. Cl.
CPC ....... *G06F 3/04815* (2013.01); *G02B 27/017* (2013.01); *G06F 3/012* (2013.01);
(Continued)

(58) Field of Classification Search
CPC ...... G06F 3/04815; G06F 3/014; G06F 3/012; G06F 3/011; G06F 3/013; G06F 3/017;
(Continued)

(56) References Cited

U.S. PATENT DOCUMENTS

| 5,803,738 A * | 9/1998 | Latham | B25J 9/1656 |
| | | | 345/157 |
| 2014/0306891 A1* | 10/2014 | Latta | G02B 27/017 |
| | | | 345/158 |

(Continued)

FOREIGN PATENT DOCUMENTS

| CN | 106200927 A | 12/2016 |
| CN | 109074160 A | 12/2018 |
| CN | 109126129 A | 1/2019 |

OTHER PUBLICATIONS

Sanz et al., "A Survery of 3D Object Selection Techniques for Virtual Environments", Computers and Graphics, Elsevier, 2013, 37 (3), 10.1016/j.cag.2012.12.003 hal-009007787.

(Continued)

*Primary Examiner* — Jeffery A Brier

(57) ABSTRACT

Devices, methods, systems, and media are described for selecting virtual objects for user interaction in an extended reality environment. Distant virtual objects are brought closer to the user within a virtual 3D space to situate the selected virtual object in virtual proximity to the user's hand for direct manipulation. A virtual object is selected by the user based on movements of the user's hand and/or head that are correlated or associated with an intent to select a specific virtual object within the virtual 3D space. As the user's hand moves in a way that is consistent with this intent, the virtual object is brought closer to the user's hand within the virtual 3D space. To predict the user's intent, hand and head trajectory data may be compared to a library of kinematic trajectory templates to identify a best-matched trajectory template.

20 Claims, 7 Drawing Sheets

(51) Int. Cl.
  *G06F 3/01*      (2006.01)
  *G02B 27/01*     (2006.01)
  *H04B 1/3827*    (2015.01)
  *G06F 3/04815*   (2022.01)

(52) U.S. Cl.
  CPC ............ *G06F 3/014* (2013.01); *G06T 19/006* (2013.01); *H04B 1/385* (2013.01)

(58) Field of Classification Search
  CPC . G06F 3/04842; G02B 27/017; G06T 19/006; G06T 19/003
  See application file for complete search history.

(56) References Cited

U.S. PATENT DOCUMENTS

| | | |
|---|---|---|
| 2017/0038837 A1 | 2/2017 | Faaborg et al. |
| 2017/0060230 A1* | 3/2017 | Faaborg ................ G06T 19/006 |
| 2018/0158250 A1* | 6/2018 | Yamamoto ............. G06T 19/20 |
| 2020/0012341 A1* | 1/2020 | Stellmach ........... G06F 3/04815 |

OTHER PUBLICATIONS

Bowman et al., "An Evaluation of Techniques for Grabbing and Manipulating Remote Objects in Immersive Virtual Environments", Graphics, Visualization, and Usability Center College of Computing, Georgia Institute of Technology.

Henrikson et al., "Head-Coupled Kinematic Template Matching: A Prediction Model for Ray Pointing in VR"., CHI 2020 Paper 362, Apr. 25-30, 2020.

* cited by examiner

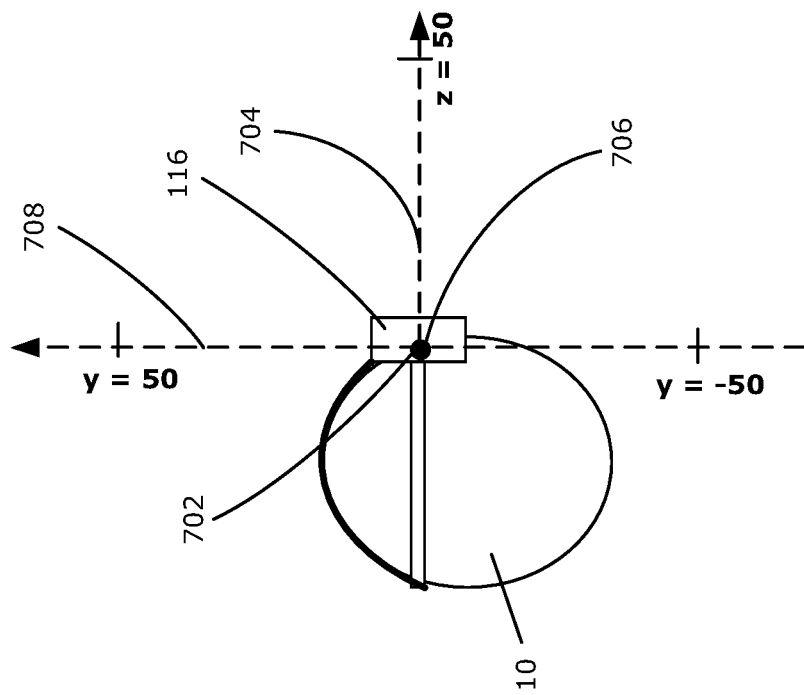
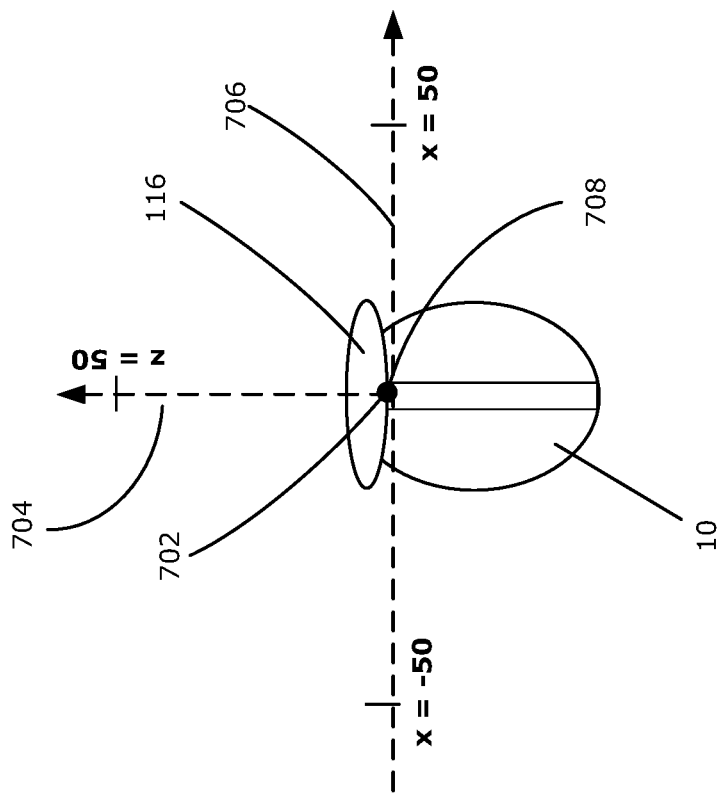

DEVICES, METHODS, SYSTEMS, AND MEDIA FOR SELECTING VIRTUAL OBJECTS FOR EXTENDED REALITY INTERACTION

RELATED APPLICATION DATA

This is the first patent application related to this matter.

FIELD

The present application generally relates to graphical user interfaces in extended reality environments, and in particular to devices, methods, systems, and media for selecting virtual objects for user interaction in an extended reality environment.

BACKGROUND

Augmented Realty (AR) and Virtual Reality (VR) have become increasingly popular in recent years. Although AR and VR technologies are unique in their own ways, AR may be considered an overlay of a virtual VR environment over a user's physical environment and thus several techniques and methods are applicable to both fields. One example is techniques for managing user interaction with graphical user interface (GUI) elements and other virtual objects that are spatially located in the virtual 3D space surrounding the user. Such interaction techniques are applicable to both AR and VR, and AR and VR may be referred to collectively as Extended Reality (XR).

In XR, virtual objects are spatially located in a virtual three-dimensional (3D) space surrounding the user as represented to the user through an XR display, unlike laptop or phone displays wherein the virtual objects are confined to a two-dimensional (2D) space close to the user. In some cases, XR GUI elements are deliberately located at a distance. This may be due to semantic anchoring information, for example an AR environment may include virtual signage affixed to a distant building in the physical environment or a wall-anchored planar AR display.

Interacting with virtual objects, such as GUI elements, at a distant location in the virtual 3D space is a fundamental user interface task in XR. Consequently, a significant amount of research has investigated this topic, ranging from novel pointing-and-selection techniques (i.e. techniques for selecting GUI elements or other virtual objects within the virtual 3D space in order to manipulate or otherwise interact with the selected virtual objects) to six degrees of freedom (DOF) manipulation (i.e. manipulation of virtual objects in three linear dimensions—height, width, depth—and three rotational dimensions—yaw, pitch, roll). Existing techniques for pointing and selection generally fall into two approaches. The first approach is ray casting based methods, which project a ray in a direction determined by user behavior, such as movement of the user's hand or user input to a VR controller, with virtual objects intercepting the ray being selected for interaction. However, as the distance between the user and the GUI elements or other virtual objects increases, the angular error of the ray casting direction increases, making it difficult to select individual virtual objects. Furthermore, because the selected virtual object is located at the tip of the ray, it is often difficult for users to rotate the object using intuitive controls. In addition, selecting a virtual object using ray casting tends to diminish the perception of tangibility of the selected virtual object by the user. The second approach to pointing and selection is arm extension based methods, which non-linearly map the user's physical hand to a distant virtual hand for interaction with distant virtual objects within the virtual 3D space. In arm extension methods, the user must adjust to a varying control-display (CD) gain function between the real hand and the virtual hand in different situations: i.e., movements of the user's physical arm and hand may be mapped to movements of the virtual hand with varying degrees of multiplication or magnification. Although arm extension methods may exhibit certain advantages over ray casting based methods, arm extension methods may be more socially awkward for users to perform, because they typically require a user to extend his or her arms outward in gross motor movements to manipulate distant virtual objects.

Overall, existing approaches to user interaction with distant virtual objects exhibit limitations with respect to the accuracy of interaction, the perceived tangibility of the virtual object, and the perception of depth in the layout of GUI elements or other virtual objects. Existing techniques to interact with distant virtual objects, such as ray casting and arm extension, suffer from angular error and CD gain function discrepancies respectively, leading to difficulties in selecting small virtual objects for interaction. Other existing approaches include methods for scaling the entire virtual environment, enlarging individual virtual objects, or zooming in on locations in the virtual 3D space (i.e. narrowing the user's field of view to shorten the perceived distance of distant locations in the virtual 3D space). However, these approaches typically result in decreasing the granularity of each virtual object, introducing CD gain discrepancy, and generally increasing the difficulty of interaction.

There thus exists a need for techniques enabling a user of an XR display to easily and intuitively interact with distant GUI elements or other virtual objects that overcome one or more of the limitations of existing approaches described above.

SUMMARY

The present disclosure describes devices, methods, systems, and media for selecting virtual objects for user interaction in an extended reality environment. Examples described herein bring selected distant virtual objects closer to the user within the virtual 3D space to situate the selected virtual object in virtual proximity to the user's hand for direct manipulation. A virtual object is selected by the user based on movements of the user's hand and/or head that are correlated or associated with an intent to select a specific virtual object within the virtual 3D space. As the user's hand moves in a way that is consistent with this intent, the virtual object is brought closer to the user's hand within the virtual 3D space.

In some embodiments, selection is performed by predicting an intended virtual object for selection based on the linear and angular velocities of head-worn and hand-worn sensors. Hand and head trajectory data is generated based on the velocity information received from the sensors, and the trajectory data is compared to a library of kinematic trajectory templates to identify a best-matched trajectory template. The best-matched template indicates a destination position of the hand, which can be used to determine an intent to select a virtual object based on ray casting.

The selected virtual object is then moved toward the user in the virtual 3D space. In some embodiments, the XR display renders the virtual object at a location closer to the user's hand, or toward a predicted future location of the user's hand, at a subsequent time step based on the predicted destination position of the hand. Once the virtual object is moved into virtual proximity to the user's hand, it can be directly manipulated by the user's hand without using the existing techniques and approaches described above for enabling user interaction with distant virtual objects. Examples described herein may therefore exhibit one or more advantages over the existing approaches described above, such as enabling users to interact with distant virtual objects without the need to adapt to changing CD gain, and with the tactility and high-resolution visual presentation of interacting with virtual objects in close proximity to the user's hand(s).

By bringing distant virtual objects into proximity with the user's hand, some embodiments may provide the user scope for direct manipulation. Such interaction in proximity to the hand may provide greater tangibility, higher precision, and greater granularity than other approaches, as it provides direct mapping to details of the selected virtual object, e.g. components of a selected collection of GUI elements. In addition, when the virtual object is moved towards the user, the range of motion of the user's hand is increased relative to approaches in which distant virtual objects are manipulated. The chance of accuracy problems in distal selection is therefore lowered, as is the risk of physical fatigue. Finally, hand-proximate interaction is more socially acceptable than distal ray casting interaction or arm-extension based interaction, because the user may maintain the hand(s) relatively close to the body rather than extending his or her arms outward to manipulate distant virtual objects.

In the present disclosure, the term "XR" refers to "extended reality", an umbrella term referring to immersive technologies such as augmented reality (AR), virtual reality (VR), and mixed reality (MR). As used herein, XR refers to the presentation of a virtual 3D visual environment to a user through an XR display. An XR display is typically a stereoscopic display capable of simulating the effects of binocular vision in a 3D environment, but in some examples may be a monoscopic display such as a conventional 2D display screen capable of rendering 3D environments by projecting them onto two dimensions.

As used herein, the terms "virtual space", "virtual 3D space", "virtual environment", and "virtual 3D environment" may be used interchangeably to mean a three-dimensional virtual space, containing virtual objects, generated by a computing device and visually presented to a user via an XR display. The virtual objects within the virtual environment are typically visually presented to the user so as to simulate viewing the object as though it were an actual physical object located at an actual physical distance from the user's point of view, with an orientation and relationship to other virtual and/or real objects that simulates the presence of the virtual object within a physical environment. In the case of VR, the user may be presented with a field of view that consists entirely of virtual objects within the virtual environment; in AR or MR, the user may be presented with a combination of the virtual objects of the virtual environment and real objects of the user's physical environment, with the virtual environment being "overlaid" over the physical environment such that the virtual objects appear to be present within the physical environment.

As used herein, the term "virtual location" refers to the representation of a virtual object within a virtual environment with respect to its apparent location relative to the user's point of view and to other virtual or physical objects. The "physical location" or "actual location" of a physical object in the user's environment refers to the actual physical location of the object relative to the user and to other physical objects in the user's physical environment. In AR or MR, virtual locations are typically defined in relation to physical locations; in VR, a physical object may be represented within the virtual environment by mapping the physical location of the physical object to a counterpart or avatar of the physical object, i.e. a virtual object representing the physical object, having a virtual location within the virtual environment that is mapped to the physical location of the object in the physical environment. The term "location" may refer to a virtual location in the context of virtual objects, and may refer to a physical location in the context of physical objects. In the case of physical objects represented in a virtual environment by an avatar (i.e. a virtual object), the "location" of the object may refer to either the physical location of the physical object or the virtual location of the corresponding avatar.

As used herein, "virtual object" may refer to any representation by a computing system of a phenomenon situated in a virtual environment at a virtual location such that a visually perceptible or otherwise perceptible stimulus is presented to a user as though the stimulus originated at the virtual location. Typically, virtual objects are visually presented to a user as 2D or 3D objects located within the 3D virtual environment. Virtual objects may include representations of real-world 3D objects (such as a 3D rendering of an airplane), 2D displays (such as a 2D rectangular screen showing a film being played), 2D sprites (such as a 2D button that can be pressed), or 3D sprites (such as a 3D slider for controlling audio volume). Virtual objects that correspond to the functionality of graphical user interface elements of a conventional computing system display—e.g., control widgets for receiving user input, display surfaces for displaying visual output such as text and images, and so on, including 3D versions thereof—may be referred to herein as "GUI elements".

In the present disclosure, the term "position" refers to a location and orientation of a physical object or virtual object, such as a user's hand or head. "Location" may refer to the position of an object with respect to 3 linear dimensions (x, y, z), and "orientation" may refer to the position of an object with respect to 3 angular dimensions (roll, pitch, and yaw). "Distance" may refer to a linear distance (e.g. a 3-dimensional linear vector with x, y, and x elements), an angular distance (e.g. a 3-dimensional angular vector with roll, pitch, and yaw elements), or a combined linear and angular distance (e.g. a 6-dimensional vector). "Distance" may refer to a scalar value indicating the length of a vector, or to a vector value including directional information.

In some aspects, the present disclosure describes a method for presenting a virtual object of an extended reality (XR) environment to a user. Initial display information configured to control an XR display to present the virtual object to the user at an initial virtual location is generated. Hand movement information indicating a velocity of the hand is obtained from one or more hand movement sensors. The hand movement information is processed to generate trajectory data. The trajectory data is processed to determine that the user intends to select the virtual object. Updated display information configured to control the XR display to present the virtual object to the user at an updated virtual location closer to the hand than the initial virtual location is generated.

By moving a selected virtual object closer to the user's hand, the method may enable the user to interact with distant virtual objects without the need to adapt to changing CD gain. By bringing the virtual object into proximity with the user's hand, the user's interaction with the virtual object may exhibit the advantages of high tactility and high-resolution visual presentation.

In some aspects, the present disclosure describes a system for presenting a virtual object of an extended reality (XR) environment to a user. The system comprises a processor device, and a memory storing machine-executable instructions thereon. The machine-executable instructions, when executed by the processing device, cause the system to perform various steps. Initial display information configured to control an XR display to present the virtual object to the user at an initial virtual location is generated. Hand movement information indicating a velocity of the hand is obtained from one or more hand movement sensors. The hand movement information is processed to generate trajectory data. The trajectory data is processed to determine that the user intends to select the virtual object. Updated display information configured to control the XR display to present the virtual object to the user at an updated virtual location closer to the hand than the initial virtual location is generated.

In some examples, the method further comprises obtaining, from one or more head movement sensors, head movement information indicating a velocity of the head of the user, and wherein processing the hand movement information to generate the trajectory data comprises processing the hand movement information and the head movement information to generate the trajectory data.

In some examples, generating the trajectory data comprises retrieving previous hand movement information from a memory, storing the hand movement information obtained from the hand movement sensors in the memory, retrieving previous head movement information from a memory, storing the head movement information obtained from the head movement sensors in the memory, and processing the previous hand movement information, the hand movement information obtained from the hand movement sensors, the previous head movement information, and the head movement information obtained from the head movement sensors to generate the trajectory data.

In some examples, the hand movement information indicates a linear velocity and an angular velocity of the hand, and the head movement information indicates a linear velocity and an angular velocity of the head.

In some examples, the one or more hand movement sensors comprise an inertial measurement unit coupled to the hand, and the one or more head movement sensors comprise an inertial measurement unit coupled to the head.

In some examples, the inertial measurement unit coupled to the hand is an inertial measurement unit of a smart watch worn on the wrist of the hand, and the inertial measurement unit coupled to the head is an inertial measurement unit of a head-mounted display device worn on the head, the head-mounted display device comprising the XR display.

In some examples, processing the trajectory data to determine that the user intends to select the virtual object comprises comparing the trajectory data to a plurality of trajectory templates to identify a best-matched trajectory template of the plurality of trajectory templates corresponding to an intent to select the virtual object.

By using trajectory template profiles to predict user movements, some embodiments may customize the training of the prediction behavior of the system to a specific user, thereby potentially increasing accuracy of prediction and therefore consistency and correctness of behavior. Another potential benefit is that generating the trajectory templates may be easy to implement and fast relative to other training techniques for motion prediction systems. Furthermore, by using template matching to predict movement, a cumulative scoring function may be used to match candidate movements with a library of templates, resulting in fast, computationally inexpensive prediction that is easy to implement.

In some examples, the method further comprises processing the trajectory data to predict a future location of the hand. The updated virtual location is closer to the future location of the hand than the initial virtual location is.

In some examples, the initial display information is configured to control the XR display to present a plurality of virtual objects to the user on the XR display. Each virtual object is presented at a respective initial virtual location. The trajectory data is processed to determine that the user intends to select any one of two or more virtual objects of the plurality of virtual objects. The updated display information is configured to control the XR display to present the two or more virtual objects to the user on the XR display at a respective two or more updated virtual locations. Each respective updated virtual location is closer to the hand than each respective initial virtual location.

In some examples, the machine-executable instructions, when executed by the processing device, further cause the system to obtain, from one or more head movement sensors, head movement information indicating a velocity of the head of the user. Processing the hand movement information to generate the trajectory data comprises processing the hand movement information and the head movement information to generate the trajectory data.

In some examples, the hand movement information indicates a linear velocity and an angular velocity of the hand, and the head movement information indicates a linear velocity and an angular velocity of the head.

In some examples, the one or more hand movement sensors comprise an inertial measurement unit coupled to the hand, and the one or more head movement sensors comprise an inertial measurement unit coupled to the head.

In some examples, the system further comprises a head-mounted display device configured to be worn on the head, comprising the XR display and the inertial measurement unit coupled to the head.

In some examples, the system further comprises a smart watch configured to be worn on the wrist of the hand, comprising the inertial measurement unit coupled to the hand.

In some examples, the system further comprises the memory further stores a plurality of trajectory templates. Processing the trajectory data to determine that the user intends to select the virtual object comprises retrieving from the memory the plurality of trajectory templates, and comparing the trajectory data to the plurality of trajectory templates to identify a best-matched trajectory template of the plurality of trajectory templates corresponding to an intent to select the virtual object.

In some examples, the machine-executable instructions, when executed by the processing device, further cause the system to process the trajectory data to predict a future location of the hand. The updated virtual location is closer to the future location of the hand than the initial virtual location is.

In some aspects, the present disclosure describes a non-transitory processor-readable medium having machine-executable instructions stored thereon. The instructions, when executed by a processor device of a device, cause the device to generate initial display information configured to control an extended reality (XR) display to present a virtual object of an XR environment to a user at an initial virtual location; obtain, from one or more hand movement sensors, hand movement information indicating a velocity of the hand; process the hand movement information to generate trajectory data; process the trajectory data to determine that the user intends to select the virtual object; and generate updated display information configured to control the XR display to present the virtual object to the user at an updated virtual location closer to the hand than the initial virtual location.

In some aspects, the present disclosure describes a processor-readable medium having instructions tangibly stored thereon. The instructions, when executed by a processor device, cause the processor device to perform the method steps described above.

BRIEF DESCRIPTION OF THE DRAWINGS

Reference will now be made, by way of example, to the accompanying drawings which show example embodiments of the present application, and in which:

FIG. 7A is a top view of a user's head illustrating an example x, y, z coordinate system defined relative to a head mounted display unit in accordance with examples described herein; and FIG. 7B is a right side view of a user's head illustrating an example x, y, z coordinate system defined relative to a head mounted display unit in accordance with examples described herein.

Similar reference numerals may have been used in different figures to denote similar components.

DESCRIPTION OF EXAMPLE EMBODIMENTS

The present disclosure describes example embodiments of devices, methods, systems, and media for selecting virtual objects for user interaction in an extended reality environment. Examples described herein bring selected distant virtual objects closer to the user within the virtual 3D space to situate the selected virtual object in virtual proximity to the user's hand for direct manipulation. A virtual object is selected by the user based on movements of the user's hand and/or head that are correlated or associated with an intent to select a specific virtual object within the virtual 3D space. As the user's hand move in a way that is consistent with this intent, the virtual object is brought closer to the user's hand within the virtual 3D space.

Example Devices and Systems

For simplicity, the present disclosure describes examples in the context of a system comprising a computing device, and XR display (e.g., a head mounted display (HMD) unit enabling stereoscopic presentation of the virtual 3D environment to a user's eyes), and a smart watch worn on the user's wrist, wherein the HMD unit and smart watch each contains an inertial measurement unit (IMU). The present disclosure describes devices, methods, systems, and media for tracking the trajectories of the user's head and hand using the IMUs, and presenting virtual objects to the user through the XR display in response to predictions of the user's intent based on the hand and head trajectories. However, it should be understood that the present disclosure is not limited to such embodiments, and the devices, methods, systems, and media described herein may be implemented in a number of different systems including different sensors to track the hand and/or head, different XR display types (such as conventional monoscopic 2D displays), and/or different configurations of computing devices or platforms to perform the calculation, communication, data storage, and data retrieval operations described herein. For example, in some embodiments an IMU may be coupled to the hand in the form of a smart ring or smart wristband.

Figure 1:
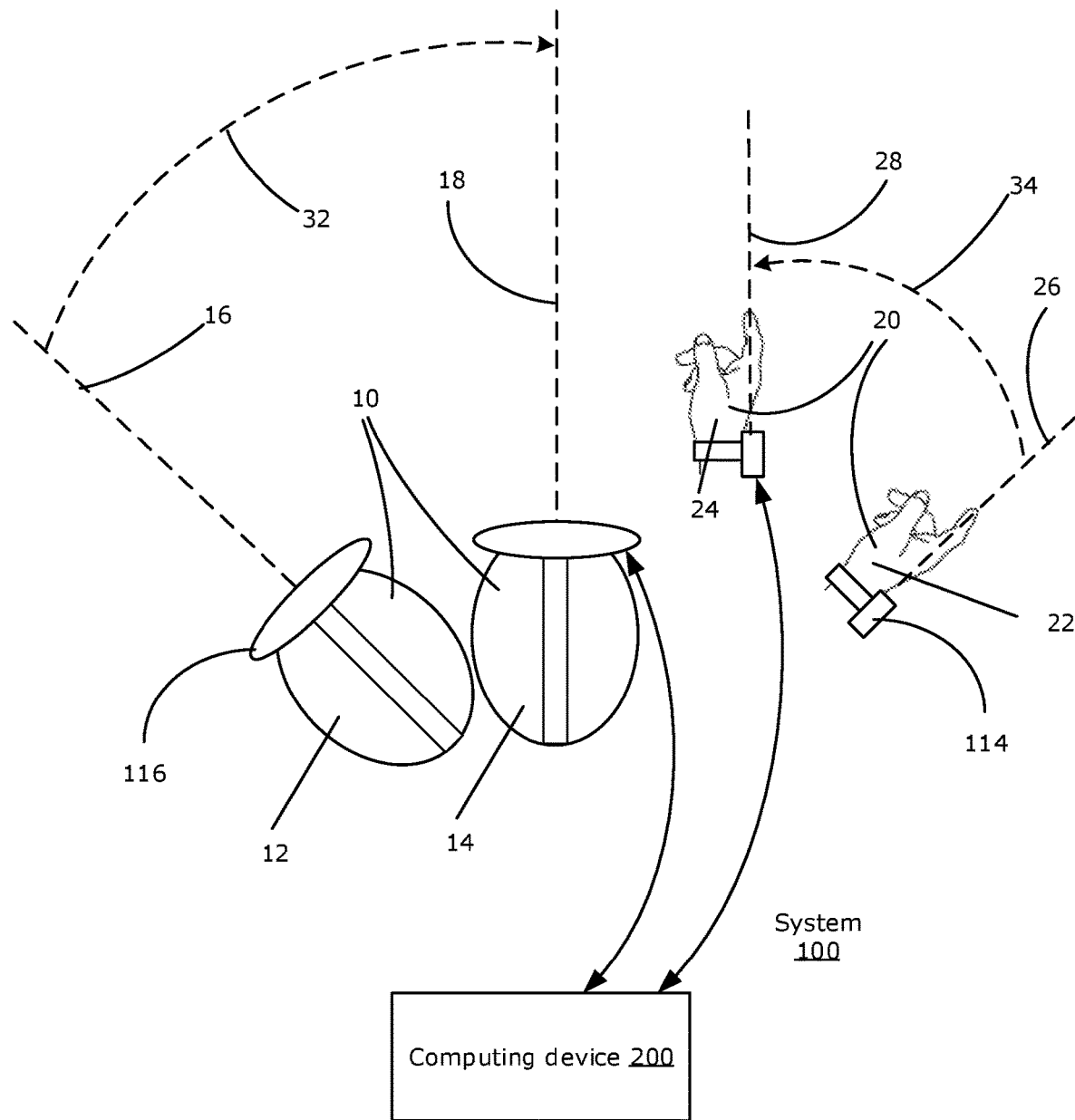
FIG. 1 is a top view of a user's hand and head illustrating a user interacting with an example system for presenting a virtual object of an XR environment to the user, in accordance with examples described herein.

FIG. 1 shows an example of a user interacting with a system 100 for selecting virtual objects for user interaction in an extended reality environment 100. In this simplified diagram, the system 100 includes a computing device 200 in communication (e.g., via wired or wireless data connections such as 802.11 or Bluetooth™) with a smart watch 114 worn on the wrist of the user's hand 20 and a head-mounted display (HMD) unit 116 worn on the user's head 10. The HMD unit 116 includes a stereoscopic XR display for presenting a virtual 3D environment to the user's eyes. In this example, the smart watch 114 includes a smart watch IMU configured to generate, and communicate to the computing unit 200, hand movement information indicating a linear velocity and an angular velocity of the hand, such as three dimensions of linear acceleration (x, y, z) detected by an accelerometer of the IMU and three dimensions of angular acceleration (roll, pitch, yaw) detected by a gyroscope of the IMU. Similarly, the HMD unit 116 includes an HMD unit IMU similarly configured to generate, and communicate to the computing unit 200, head movement information indicating a linear velocity and an angular velocity of the head. In other embodiments, IMUs may be coupled to the user's hand 20 and/or head 10 using means other than the smart watch 114 and/or HMD unit 116. In other embodiments, other hand sensors and/or head sensors may be included in the system 100 in addition to, or instead of, the IMUs, for the purpose of providing the head and hand movement information. The other sensors may include, in various embodiments, infrared (IR) cameras, red/green/blue (RGB) cameras, other conventional digital cameras, motion sensors, and/or any other sensor type that may enable tracking of hand and/or head movement and/or orientation. In some embodiments, one or more of these other sensors may be used to sense both head and hand movements. In some embodiments, the other sensors may be used to supplement the data from the IMUs to provide better accuracy in tracking hand and head movements.

In FIG. 1, the IMUs and/or other sensors are used to track movement of the head 10 and hand 20. The head 10 is shown moving between a first position 12, indicated by a first location and angular orientation of the HMD unit 116, and a second position 14, indicated by a second location and angular orientation of the HMD unit 116. Movement between the first position 12 and second position 14 is indicated as head trajectory 32. The direction of view of the head 10 in the first position 12 is shown as first view direction 16, and the direction of view of the head 10 in the second position 14 is shown as second view direction 18. The hand 20 is shown moving between a first position 22, indicated by a first location and angular orientation of the smart watch 114, and a second position 24, indicated by a second location and angular orientation of the smart watch 114. Movement between the first position 22 and second position 24 is indicated as hand trajectory 34. The pointing direction of the hand 20 in the first position 22 is shown as first pointing direction 26, and the pointing direction of the hand 20 in the second position 24 is shown as second pointing direction 28. The pointing directions 26, 28 and/or view directions 16, 18 may be used to perform ray casting, as described with respect to virtual object selection operations with reference to FIG. 3 below.

It will be appreciated that the head trajectory 32 and hand trajectory 34 are shown in FIG. 1 in two dimensions and without showing angular changes in the orientation of the head 10 or hand 20; however, example embodiments may track the linear movement of the head 10 and hand 20 in three dimensions and the angular changes in head and hand orientation in three dimensions, thereby resulting in six-dimensional trajectories for the head 10 hand 20.

Thus, in some embodiments the IMUs of the HMD unit 116 and smart watch 114 may generate and communicate to the computing unit 200 hand movement information and head movement information, respectively, each including six dimensions of movement information corresponding to the hand trajectory 34 and head trajectory 32, respectively.

Figure 2:
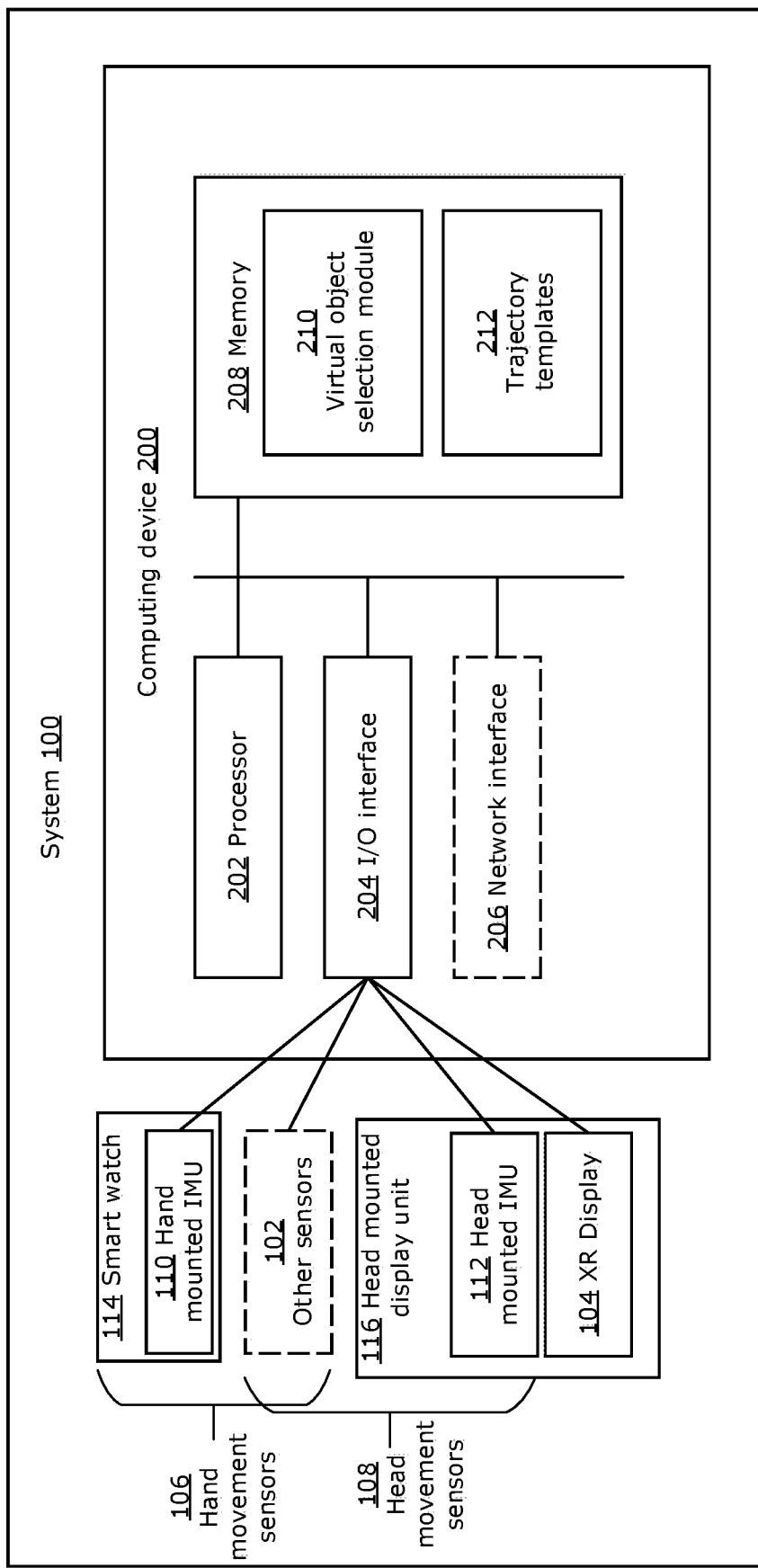
FIG. 2 is a block diagram illustrating some components of an example system including a computing device suitable for presenting a virtual object of an XR environment to a user, in accordance with examples described herein.

FIG. 2 is a block diagram of the computing device 200. Although an example embodiment of the computing device 200 is shown and discussed below, other embodiments may be used to implement examples disclosed herein, which may include components different from those shown. Although FIG. 2 shows a single instance of each component of the computing device 200, there may be multiple instances of each component shown.

The computing device 200 includes one or more processors 202, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 202 may collectively be referred to as a "processor device". The computing device 200 also includes one or more input/output (I/O) interfaces 204, which interfaces with input devices such as the hand movement sensors 106 (e.g., the hand mounted IMU 110 of the smart watch 114 and/or any other sensors 102) and head movement sensors 108 (e.g., the head mounted IMU 112 of the HMD unit 116 and/or any other sensors 102), and output devices such as the XR display 104 of the HMD unit 116. The computing device 200 may interface with other input devices (e.g., buttons, microphone, touchscreen, keyboard, etc.) and other output devices (e.g., speaker, vibration unit, etc.) included in the system 100.

The computing device 200 may include one or more optional network interfaces 206 for wired or wireless communication with a network (e.g., an intranet, the Internet, a P2P network, a WAN and/or a LAN) or other node. The network interface(s) 206 may include wired links (e.g., Ethernet cable) and/or wireless links (e.g., one or more antennas) for intra-network and/or inter-network communications. In some embodiments, one or more network interfaces 206 may be used as, or instead of, the I/O interfaces 204 for communication with one or more of the input devices and/or output devices described above, for example using 802.11 or Bluetooth™ wireless communication.

The computing device 200 includes one or more memories 208, which may include a volatile or non-volatile memory (e.g., a flash memory, a random access memory (RAM), and/or a read-only memory (ROM)). The non-transitory memory(ies) 208 may store machine-executable instructions for execution by the processor(s) 202, such as to carry out examples described in the present disclosure. A set of machine-executable instructions defining a virtual object selection module 210 is shown stored in the memory(ies) 208, which may be executed by the processor(s) 202 to perform the steps of the methods described herein. The operation of the system 100 in executing the virtual object selection module 210 is described below with reference to FIG. 3. The virtual object selection module 210 includes machine-executable instructions that are executable by the processor(s) 202 to perform the functions of each subsystem 310, 320, 330 thereof. The memory(ies) 208 may include other software instructions, such as for implementing an operating system and other applications or functions.

The memory(ies) 208 may also store a library of trajectory templates 212, which are generated and used by the virtual object selection module 210, as described below with reference to FIG. 3.

In some examples, the computing device 200 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the computing device 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the computing device 200 may communicate with each other via a bus, for example.

In some embodiments, a distributed system may include multiple computing devices 200 as well as optionally one or more additional components. The distributed system may include multiple computing devices 200 in communication with each other over a network; for example, a videoconferencing system may comprise a computing device 200 for each remotely participating user, with optionally a central server. In some embodiments, the distributed system is an extended reality system that includes a single computing device 200 and multiple hand movement sensors 106, head movement sensors 108, and XR displays 104. In this embodiment, the single computing device 200 is used to track the hands and heads of multiple users and present virtual objects to the various users in response thereto. It will be appreciated that these systems are provided as examples, and that other distributed systems are possible.

It will be appreciated that different embodiments may include different combinations of input and output devices in place of, or in addition to, the sensors 106, 108, 102 and XR display 104 described above. For example, a single large shared XR display, with one or more digital cameras used as head movement sensors 108 and hand movement sensors 106, may be used in a shared XR application for multiple users present in a shared physical space.

Example Virtual Object Selection Module

Figure 3:
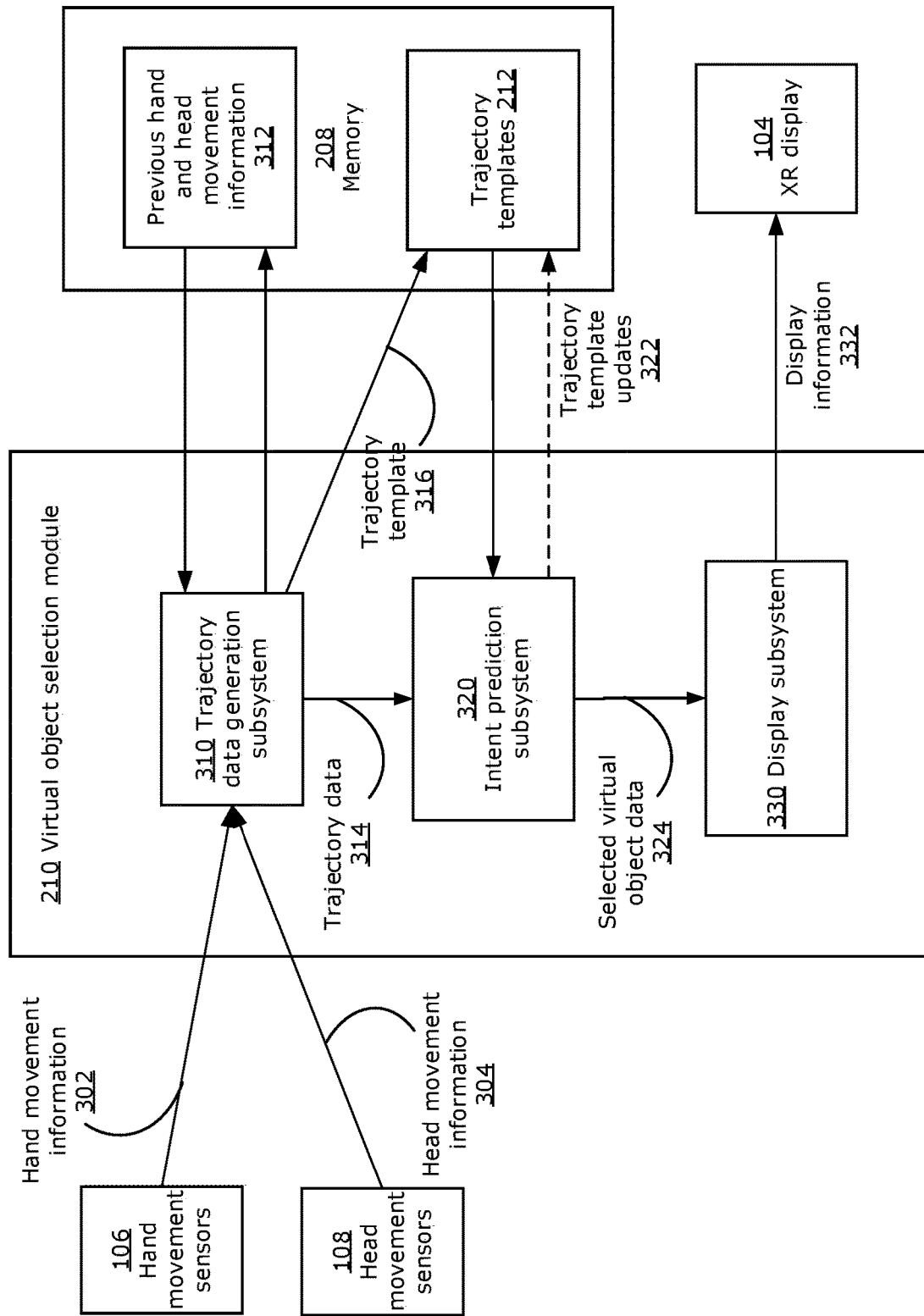
FIG. 3 is a block diagram illustrating the inputs and outputs of various subsystems of an example virtual object selection module of the computing system of FIG. 2.

FIG. 3 illustrates an example virtual object selection module 210 executed by the computing device 200. In this example, the virtual object selection module 210 is shown consisting of three subsystems: a trajectory data generation subsystem 310, and intent prediction subsystem 320, and a display subsystem 330. Whereas the virtual object selection module 210 is described herein as implemented by machine-executable instructions executed by the processor device 202 of the computing system 200, in some embodiments one or more operations of the virtual object selection module 210 may be performed by specialized hardware (such as an application-specific integrated circuit (ASIC)) or by a separate computing device or platform within the system 100.

The virtual object selection module 210 may operate in two distinct modes: a training mode and a prediction mode. In the training mode, the user is prompted to perform a series of virtual object selection tasks. Head and hand movement information is collected during performance of each task and stored as a kinematic trajectory template (also called simply a "trajectory template" herein) in association with the corresponding task. Each trajectory template thus provides a template, customized to a specific user, of the users typical head and hand motions while performing a specific virtual object selection task. These trajectory templates can be used to predict the intent of the user based on hand and head movements during prediction mode.

With reference to FIG. 3, the trajectory generation subsystem 310 receives hand movement information 302 from the hand movement sensors 106 and head movement information 304 from the head movement sensors 108 while the user is performing each task. The hand movement information 302 and head movement information 304 may be temporarily stored in the memory 208 as previous hand and head movement information 312 in order to generate a time series of the received movement information 302, 304 in the course of generating the trajectory template. The trajectory generation subsystem 310 generates a trajectory template 316 based on the hand movement information 302 and head movement information 304, and stores the trajectory template 316 in the memory 208, in association with data identifying the corresponding task, as one of a library of trajectory templates 212.

The movement information 302, 304 obtained from the sensors 106, 108 may represent hand and head movements in various different ways. In some embodiments, positional velocity may be measured and represented in millimeters per second change of linear dimensions (x, y, z) over the time. In some embodiments, angular velocity may be measured in degrees per second change in a forward facing vector of the hand or head over time. In some embodiments, such as the example shown in FIG. 1, the forward facing vector of the head 10 is parallel to the eye gaze direction (i.e. the view direction 16, 18). The forward facing vector of the head 10 uses a point between the eyes as the origin, the dimension from left to right as the x-axis, the dimension from top to bottom as the y-axis, and the dimension from back to front (i.e. parallel to the forward facing vector) as the z-axis. In FIG. 1, the forward facing vector of the hand 20 is parallel to the hand 20, extending from the elbow joint to the tip of an extended index finger. It will be appreciated that these movement information representations and/or dimensional definitions may differ in different embodiments.

FIGS. 7A and 7B illustrate an example coordinate system defined relative to an HMD unit 116. FIG. 7A is a top view of the user's head 10; FIG. 7B is a right side view of the user's head 10. The head 10 has an HMD unit 116 mounted thereon. The origin 702 of the coordinate system is located roughly between the user's eyes as defined by the position of the HMD unit 116. The z axis 704 extends along the front-facing vector in the direction of the user's gaze; z values increase in the forward direction from the origin 702 as indicated by the arrow. The x axis 706 extends from the user's left to right, with negative x values to the left of the origin 702 and positive x values to the right of the origin 702, as indicated by the arrow. The y axis 708 extends from top to bottom, with negative y values below the origin 702 and positive y values above the origin, as indicated by the arrow. The examples values shown (e.g. x=50, y=−50) are simply intended as examples to show positive and negative values.

The virtual object selection tasks used to generate the trajectory templates may be reciprocal pointing tasks wherein the user is prompted to point with the hand 20 (e.g., using the index finger of the hand 20) back and forth between a pair of targets in the 3D environment. For each pair of known target locations, which may be defined with respect to the virtual field of view of the XR display 104, the trajectory generation subsystem 310 records the trajectory profiles of both head 10 and hand 20 based on the movement information 302, 304 obtained during performance of the task. At any moment, one of the targets in the pair is a start target and the other is an end target. The pair of targets may be labeled in the XR environment, may appear in different colors, or may otherwise be distinguished to aid the user in performing the task. The virtual locations of the targets can be varied, for example, in the depth (measured in meters) along the forward facing axis of the head 10, the angular spread (measured in degrees) along the x axis between the pair of targets with respect to the head 10, and the vertical location of the targets (0-359 degrees) with respect to a vertical plane parallel to the y-axis in front of the user. The size of the targets may be defined by an angular width with respect to the x axis of the head 10. A fixed angular width may ensure that the target is visible and the size is not dependent on the depth along the forward facing axis of the head 10. During the reciprocal pointing task, the pair of targets may be arranged in opposite locations, for example, if a first target has a negative x coordinate value (i.e. to the left of the origin 702 as shown in FIG. 7A), then the other target will have a positive x coordinate value. It will be appreciated that different types of pointing or selection tasks, or different target configurations, may be used to generate the trajectory templates.

In the reciprocal pointing task, the user is considered to have completed the task when a ray cast along the forward facing vector of the user's hand 20 has intersected the target, as described in greater detail with reference to FIG. 5 below. When the ray intersects the target, the user may be presented with feedback including one or more of the following: a change in the color of the target, audio feedback, a change in the label of the target, vibratory feedback through the smart watch 114 and/or HMD unit 116, or any other suitable visual, auditory, tactile, or other sensory feedback.

During each reciprocal pointing task, the trajectory generation subsystem 310 generates a corresponding trajectory template 316, including four trajectory profiles, and stores the trajectory template 316 in the trajectory template library 212 on the memory 208. Two of the four profiles represent the head's angular velocity and hand's angular velocity over the time period in which the task is performed, measured in, e.g., degrees per second. These first two profiles may be considered to be the change in direction of the respective forward facing vectors of the head 10 and hand 20 over time, e.g. the change of the hand's forward facing vector from first pointing direction 26 to the second pointing direction 28 and the change of the head's forward facing vector from first view direction 16 to the second view direction 18. The other two of the four profiles represent the positional velocity of the head 10 and the positional velocity of the hand 20 over time, measured, e.g., in millimeters per second. These last two profiles may be considered to be the change in location of the head 10 and hand 20 over time, e.g. the change of the hand's location from first position 22 to second position 24 and the change of the head's location from first position 12 to second position 14. The trajectory template 316 associated with the task may include these four profiles. Thus, each trajectory template essentially encodes user hand and head trajectory information (i.e. angular and linear velocity at each point in time during the task) corresponding to a hand movement between a particular starting target and a particular ending target. These trajectory templates may be used in prediction mode to predict the remaining part of a partial trajectory that has been begun by the user.

In some embodiments, other training approaches may be used in place of a template-based approach. Some embodiments may use machine learning techniques, such as supervised learning, to train a prediction model such as a convolutional neural network. It will be appreciated that a number of training techniques are available to train the virtual object selection module 210 to perform prediction of user intent in prediction mode, using the same general inputs and outputs described herein.

In prediction mode, the virtual object selection module 210 uses the stored trajectory templates to predict the intent of the user based on hand and head movement information received from the hand and head sensors while the user is interacting with the virtual 3D environment. If the virtual object selection module 210 predicts that the user intends to select a particular virtual object for interaction, the selected virtual object is presented on the XR display such that its virtual location moves toward the user's hand, or toward a predicted destination position of the user's hand, thereby bringing the selected virtual object into proximity with the user's hand for manipulation or other interaction.

In some embodiments, the virtual object selection module 210 may perform ongoing training and refinement during prediction mode. For example, the trajectory templates 212 stored in the memory 208 may be updated during prediction mode based on hand and head movement patterns detected while the user performs particular selection tasks over time. For example, if the user's hand consistently performs a particular selection task in a way that diverges from the associated trajectory template for that task, the trajectory template for that task may be updated to more closely match the observed difference by sending trajectory template updates 322 from the input prediction subsystem 320 to the library of trajectory templates 212 stored in the memory 208. In some embodiments, rather than updating an existing trajectory template with new values indicating a different trajectory, additional trajectory templates may be added to the library 212 as additional trajectory patterns are observed being performed by the user during prediction mode.

The virtual object selection module 210 may operate in prediction mode once the library of trajectory templates 212 has been generated and stored, or the virtual object selection module 210 has otherwise been trained to perform prediction of the user's intent. In prediction mode, the three subsystems 310, 320, 330 of the virtual object selection module 210 perform three distinct tasks. The trajectory data generation subsystem 310 generates trajectory data 314 based on the received hand movement information 302 and head movement information 304. As in training mode, the hand movement information 302 and head movement information 304 may be temporarily stored in the memory 208 as previous hand and head movement information 312 in order to generate a time series of the received movement information 302, 304 in the course of generating the trajectory data 314.

The trajectory data 314 generated by the trajectory data generation subsystem 310 may include the four velocity profiles described above (angular and linear velocity of both head and hand) from the beginning of a movement up to a time t.

The intent prediction subsystem 320 receives the trajectory data 314 and compares the trajectory data 314 to the library of trajectory templates 212 retrieved from the memory 208 to find a best-matched trajectory template, as described below with reference to FIG. 4. Based on the best-matched trajectory template, the intent prediction subsystem 320 predicts an intended destination position of the hand (i.e. a location and angular orientation of the hand 20), for example by adding the total distance traveled (and total angular change in orientation) by the hand 20 in the best-matched trajectory template to the initial position (i.e. location and orientation) of hand 20 at the beginning of the current movement. A detailed example of predicting the destination position of the hand 20 is described below with reference to FIG. 5.

Thus, the best-matched trajectory template may be used to essentially extrapolate the current movement pattern of the hand 20 (as encoded in the trajectory data 314) out to a predicted endpoint represented by the endpoint of the best-matched trajectory template. The predicted endpoint provides an estimate of how far the hand will travel (both linearly and angularly) from its starting position, and this estimated distance may be added to the hand's starting position to obtain the destination position (i.e. location and angular orientation) of the hand 20.

Figure 4:
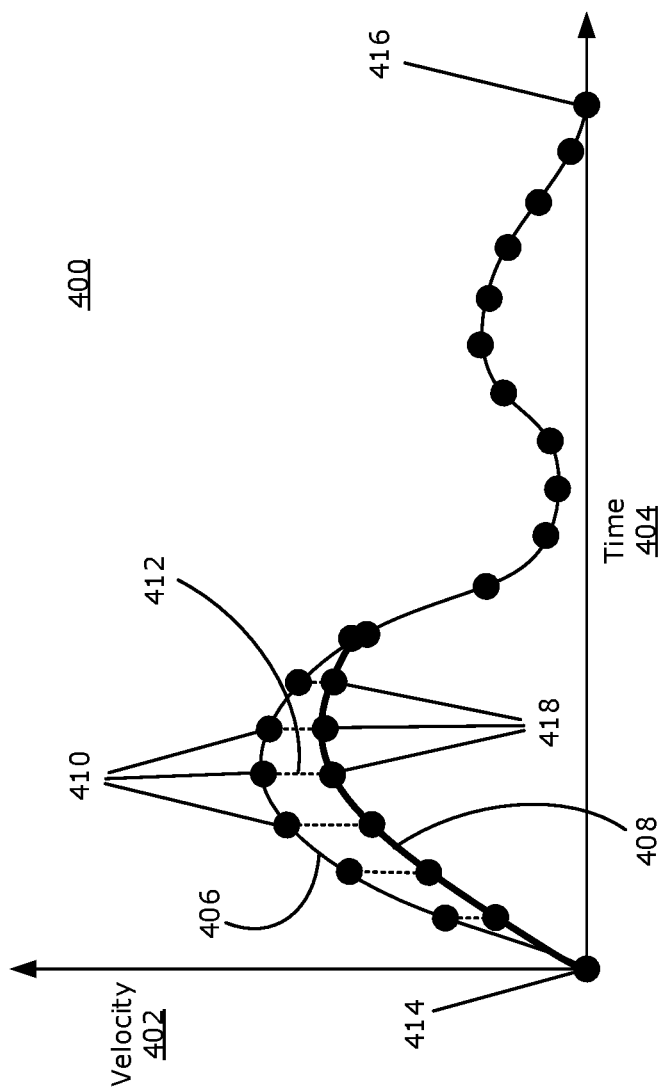
FIG. 4 is a graph showing an example trajectory template being compared to trajectory data by an example intent prediction subsystem of the virtual object selection module of FIG. 3.

FIG. 4 illustrates a graph 400 showing an example trajectory template 316 from the library of trajectory templates 212 being compared to trajectory data 314 by an example intent prediction subsystem 320. For the sake of simplicity, only a single dimension of a single profile of the four profiles is shown, for both the trajectory template 316 and the trajectory data 314.

The graph 400 shows a candidate profile 408 of the trajectory data 314 being compared to a template profile 406 of the trajectory template 316. The template profile 406 is graphed as velocity 402 (such as the x-dimension linear velocity of the head 20) over time 404, as a time series of template data points 410 from a starting data point 414 to an ending data point 416. The candidate profile 408 is also graphed as the same velocity 402 type as the template profile 406 (in this example the x-dimension linear velocity of the head 20) over time 404, as a time series of candidate data points 418.

The trajectory data 314 may be generated by the trajectory data generation subsystem 310 on a continuous basis, such that the intent prediction subsystem 320 receives updated trajectory data 314 each time one or more new candidate data points 418 is added to the trajectory data 314. As soon as each new candidate data point 418 is received by the intent prediction subsystem 320, the intent prediction subsystem 320 compares each candidate profile 408 with each corresponding template profile 406 of each trajectory template in the library 212. The user's intent is predicated based on the premise that the closer the trajectory data 314 is to a given trajectory template 316, the more likely it is that the user's current hand and head movements will follow the trajectory template 316. The intent prediction subsystem 320 may perform this comparison by using a cumulative scoring function:

$$S(T_i) = S(T_i^*) + \begin{cases} \dfrac{\sum_{j=0}^{n_c} |C_j - T_{ij}|}{n_c}, & n_c \leq n_t \\ \dfrac{\sum_{j=0}^{n_t} |C_j - T_{ij}| + \sum_{j=n_t+1}^{n_c} C_j}{n_c}, & n_c > n_t \end{cases} \quad \text{(Equation 1)}$$

In Equation 1, $T_i$ is the $i^{th}$ trajectory template in the library 212, $C_j$ is the $j^{th}$ velocity value (i.e. candidate data point 418) from the candidate profile 408, $T_{ij}$ is the $j^{th}$ velocity value (i.e. template data point 410) from the $i^{th}$ trajectory template, $n_c$ is the number of candidate data points 418 in the candidate profile 408, and $n_t$ is the number of template data points 410 in the template profile 406. As long as there is a corresponding template data point 410 in the template profile 406 that aligns with the time position of the candidate data point 418 ($n_c \leq n_t$), Equation 1 measures the difference 412 between the template data point 410 and its corresponding candidate data point 418. However, if the number of candidate data points 418 is more than the number of template data points 410, then the values of the candidate data points 418 are added to the cumulative score. In Equation 1, $S(T_i^*)$ is the prior cumulative score. This is repeated for all dimensions of all four velocity profiles (or, equivalently, a score is calculated using 3-dimensional velocity vector values for each of the four velocity profiles) to generate four scores for each trajectory template: $S_{head_{angular}}$ indicating the angular velocity profile of the head 10, $S_{head_{positional}}$ indicating the linear velocity profile of the head 10, $S_{hand_{angular}}$ indicating the angular velocity profile of the hand 20, and $S_{hand_{positional}}$ indicating the linear velocity profile of the hand 20.

Arbitrary tuning parameters a, b, c, d may be used to tune the prediction algorithm such that the final cumulative score of trajectory template $T_i$ is:

$$S(T_i) = aS_{head_{angular}}(T_i) + bS_{head_{positional}}(T_i) + cS_{hand_{angular}}(T_i) + dS_{hand_{positional}}(T_i) \quad \text{(Equation 2)}$$

It will be appreciated that if a=b=c=0, then Equation 2 represents a general template matching algorithm for a 2D mouse movement.

Once all the candidate movements has been compared to all the templates, the intent prediction subsystem 320 chooses $\min(S(T_i))$, i.e. the best-matched trajectory template $T_i$ from the library 212 having the lowest cumulative score.

In some embodiments, the intent prediction subsystem 320 may choose two or more trajectory templates from the library 212 that are all close matches to the trajectory data 314, and combine the two or more trajectory templates to generate a combined trajectory template. For example, if two or more trajectory templates in the library 212 all produce a final cumulative score $S(T_i)$ less than a predetermined trajectory similarity threshold value, the two or more trajectory templates may be combined by averaging or otherwise aggregating their data points to generate a combined trajectory template. The combined trajectory template may then be used as the best-matched trajectory template as described above; as used herein, the term "best-matched trajectory template" may be understood to also potentially refer to such a combined trajectory template. The trajectory similarity threshold value may be, e.g., determined via a configuration setting of the virtual object selection module 210.

The intent prediction subsystem 320 may then predict a destination position of the hand 20 based on the hand's starting position and the change in position (i.e. location and orientation) represented by the best-matched trajectory template $T_i$:

Final landing position=original start position+distancetravelled$_{T_i}$ (Equation 3)

The intent prediction subsystem 320 may then predict the user's intent to select a virtual object select by checking which virtual object is intersected by a ray cast along the forward facing vector of the hand 20 at the predicted destination position of the hand 20, as described in reference to FIG. 5 below. The selected virtual object may be identified in selected virtual object data 324 generated by the intent prediction subsystem 320. In some embodiments, the selected virtual object data 324 may also identify the predicted destination position of the hand 20, or at least the predicted destination location (i.e. x, y, and z coordinates) of the hand 20.

The display subsystem 330 receives the selected virtual object data 324 identifying the selected virtual object and the predicted destination position (or location) of the hand 20. The display subsystem 330 uses the selected virtual object data 324 to visually present the selected virtual object to the user via the XR display 104 such that the virtual location of the selected virtual object changes over time to move closer to the user's hand 20, or closer to the predicted destination location of the hand 20, as the user's hand 20 moves.

In some embodiments, the display subsystem 330 detects the virtual location at time T of the selected virtual object. The display subsystem 330 then translates the selected virtual object from its virtual location at time T towards the predicted destination location of the hand 20 at time T+1. The translational speed S, measure, e.g., in units per second, may be tunable based on configuration settings of the virtual object selection module 210. Once the selected virtual object reaches the proximity of the hand (wherein proximity to the hand may be defined as a region or distance threshold tunable based on configuration settings of the virtual object selection module 210), the selected virtual object may then be anchored around the hand 20, thereby maintaining the virtual location of the selected virtual object relative to the hand 20, while the user interacts with the selected virtual object.

Figure 5:
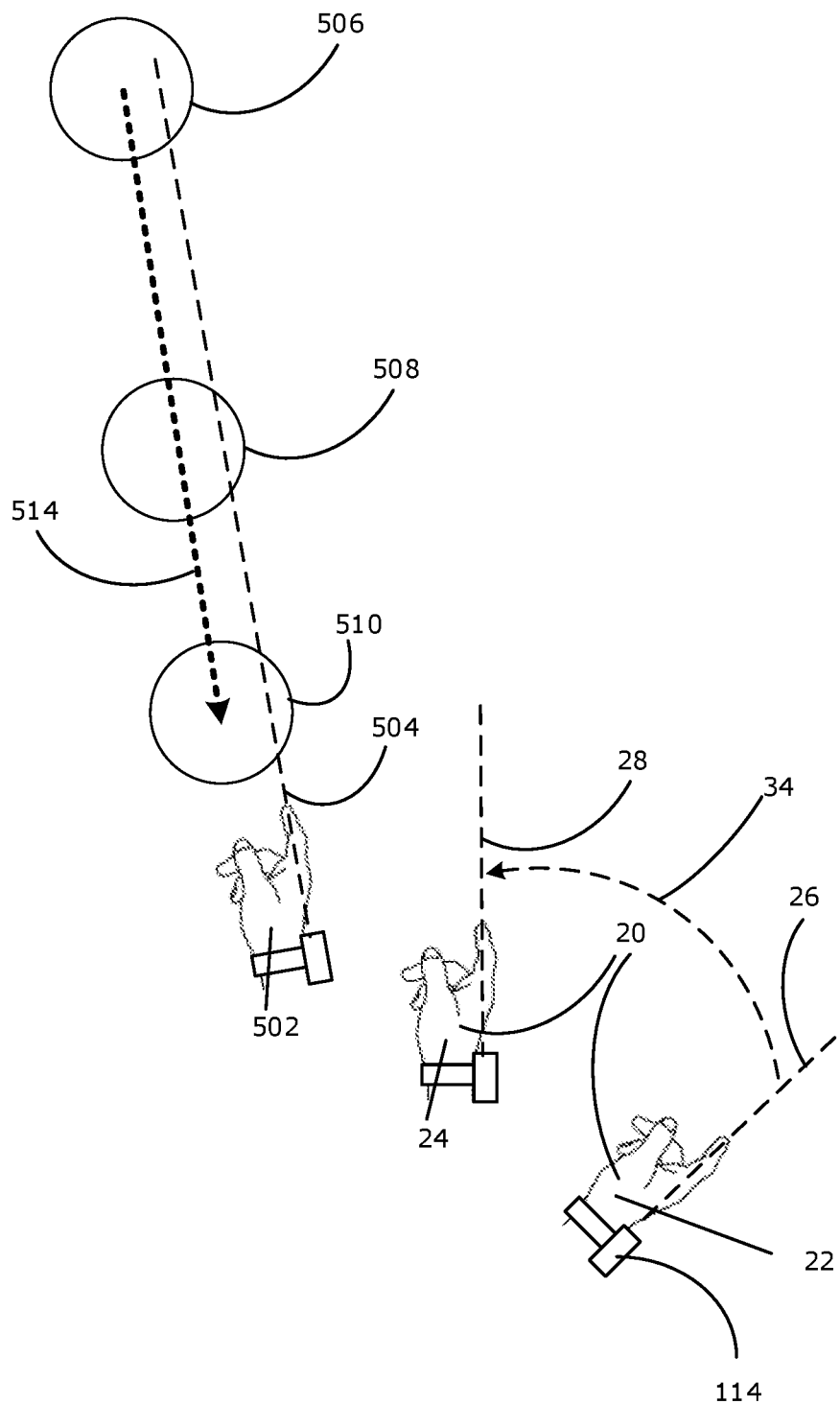
FIG. 5 is a top view of a user's hand illustrating the prediction of a destination position of a user's hand and presentation of a virtual object in proximity to the predicted destination position on an XR display in response thereto, in accordance with examples described herein.

FIG. 5 shows the operation of an example virtual object selection module 210 to select a virtual object and bring it into proximity with the user's hand for interaction. As in FIG. 1, the user's hand is shown moving from a first position 26 (e.g., at time T) to a second position 28 (e.g., at time T+1). Hand movement information 302 is obtained from the IMU of the smart watch 114 from time T to time T+1 (indicating hand movement 34) and used by the trajectory data generation subsystem 310 (along with head movement information 304 from the IMU of the HMD unit 116, not shown) to generate trajectory data 314. The trajectory data 314 is used by the intent prediction subsystem 320 to select a best-matched trajectory template from the library 212. The starting position of the hand 20 (i.e. first position 22) and the total distance traveled in the best-matched trajectory template are used to predict a destination position of the hand 20 at a future time (e.g. at time T+2) corresponding to the ending data point 416 of the template profile 406 in FIG. 4 for the best-matched template. In this example, the predicted destination position of the hand 20 is shown as third position 502, in which the forward-facing vector of the hand is shown as third pointing direction 504.

The predicted destination position of the hand 20 is used to identify a selected virtual object by casting a ray from the third position 502 of the hand 20 along the third pointing direction 504, and determining that the ray intersects with the virtual object at initial location 506. Because the selected virtual object is identified while the hand 20 is still in motion, the selected virtual object can be translated toward the hand 20, or toward the predicted destination position of the hand 20, while the hand 20 is still in motion. Specifically, the display subsystem 330 presents the selected virtual object at different locations at different times, e.g. at initial virtual location 506 at time T, at intermediate virtual location 508 at time T+1, and at final virtual location 510 at time T+2, such that the final virtual location 510 is in proximity (as defined above) to the predicted destination position of the hand 20.

It will be appreciated that, whereas FIG. 5 shows only three virtual locations 506, 508, 510 of the selected virtual object over time, example embodiments may continuously update the virtual location of the selected virtual object and re-present the selected virtual object on the XR display 104 as often as the 3D environment can be rendered and displayed, such as 30 times a second or more. Furthermore, the predicted destination position of the hand 20 may be updated continuously based on the operations of the intent prediction subsystem 320 described above, in response to continuous updates of the trajectory data 314 by the trajectory data generation subsystem 310 based on newly received hand and head movement information 302, 304. Thus, whereas the selected virtual object in FIG. 5 is shown moving toward the static third position 502 along directional vector 514, it will be appreciated that in some embodiments the direction and/or speed of movement of the selected virtual object, and/or the predicted third position 502 of the hand 20, will change over time in response to changes in the actual movement of the hand 20 and head 10 and/or changes in the calculations performed by the intent prediction subsystem 320.

Thus, an iterative step function may be used to bring the selected virtual object into the proximity of the hand 20. While the hand 20 is in motion, the intent prediction subsystem 320 continuously predicts the destination position of the hand 20 at a final time T+2. A directional vector 514 from the current virtual location (e.g. initial virtual location 506) ($x_{current}$, $y_{current}$, $z_{current}$) of the selected virtual object to the predicted destination position of the hand 20 (x, y, z). This translational vector 514 moves the selected virtual object at time T+1 towards the predicted destination position of the hand 20 with speed V. The speed V may be a function of the movement of the hand 20 over time as predicted by the best-matched trajectory template (which itself may change over time based on changes in the movement of the hand 20 and/or head 10).

The iterative step function described above may provide one or more advantages over alternative approaches. First, iteratively translating the selected virtual object may provide a margin of error in user intent prediction. This is because, while the hand is still in motion, the trajectory template matching algorithm performed by the intent prediction subsystem 320 can still correct a previously predicted destination position of the hand 20, and therefore a previously identified virtual object for selection. By the time this error is rectified, the previously predicted virtual object for selection would have made a slow progression towards the hand through the iterative step function, which progression can be reversed as the newly identified virtual object is brought forward toward the hand 20.

Second, since the speed V by which the selected virtual object translates towards the hand 20 is a function of the hand's movement over time, a slow initial velocity of the hand 20 keeps the speed V low. As the velocity of the hand 20 over its predicted total travelled distance increases, the speed V can increase linearly. The benefit of this linear function is that, if the intent prediction subsystem 320 initially predicts incorrectly and the incorrect prediction is corrected over time, the new predicted virtual object for selection will have less time to reach the proximity of the hand 20 than the previously predicted virtual object for selection. A fixed speed V would slow down the translation of the selected virtual object as the prediction operations of the intent prediction subsystem 320 correct the prediction over time.

Third, the iterative step function may provide a smooth translation of the predicted virtual object for selection toward the hand 20.

In some examples, the speed V by which the selected virtual object translates towards the hand 20 may also be determined based on a total distance the selected virtual object must travel to reach the proximity of the hand. For example, a value $depth_{proximity}$ may be a proximity threshold defining the minimum distance between the hand and the selected virtual object in order for the selected virtual object to be considered in the proximity of the hand 20. The value $depth_{VO}$ may define the depth of the location of the selected virtual object at a given time. Initially, with respect to, e.g., the origin of the front-facing vector of the head 10 (e.g. the spot between the user's eyes as described above), $depth_{VO} > depth_{proximity}$. The selected virtual object is translated towards the proximity of the hand 20 until $depth_{VO}$ $depth_{proximity}$. After that, the selected virtual object remains anchored around the hand 20. The user can choose to interact with the selected virtual object using direct touch manipulation in the XR environment.

Example Methods

Figure 6:
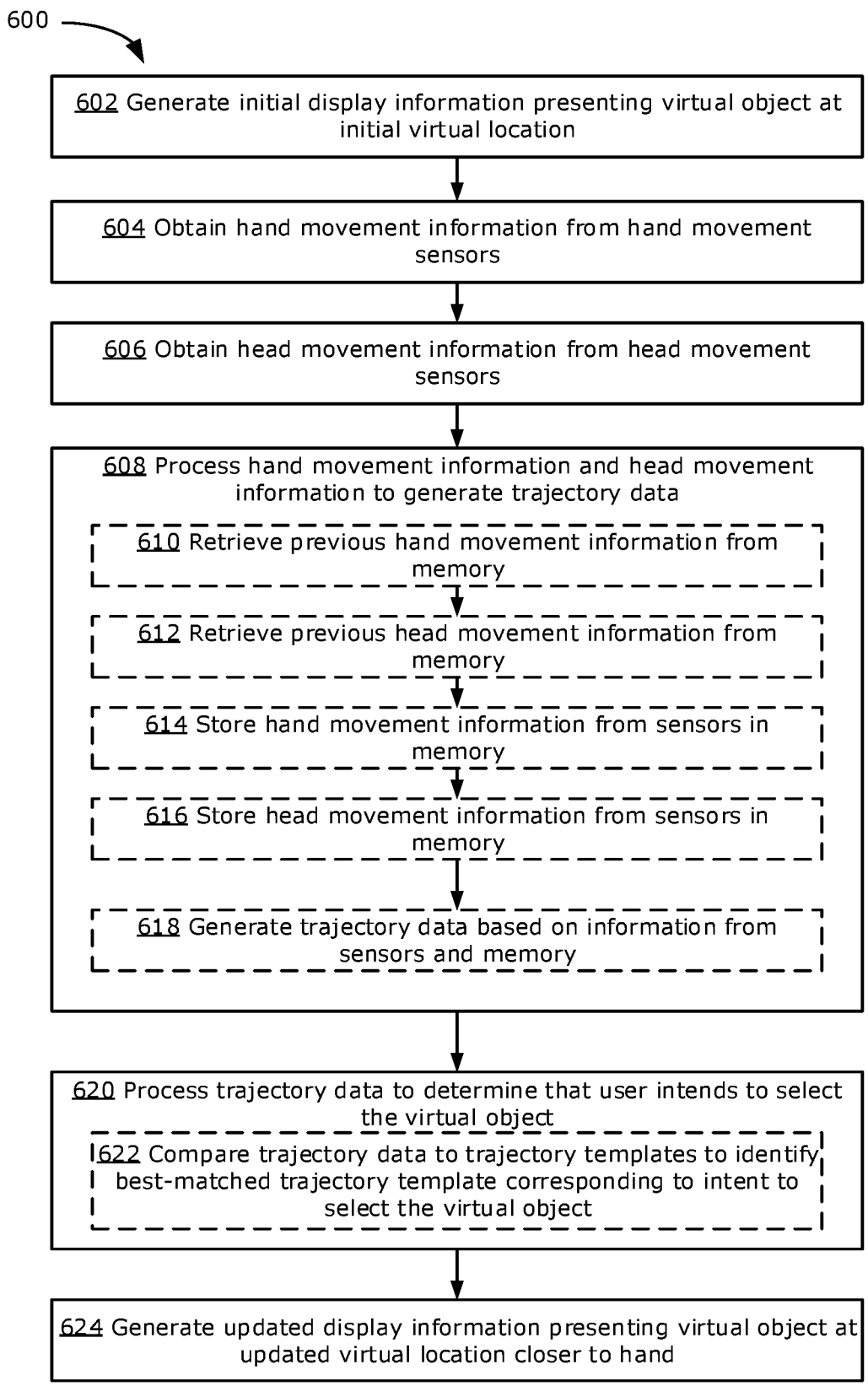
FIG. 6 is a flowchart illustrating an example method for presenting a virtual object of an XR environment to a user that may be performed in prediction mode by the virtual object selection module of FIG. 3.

FIG. 6 is a flowchart showing steps of an example method 600 for presenting a virtual object of an XR environment to a user. In the example embodiments described below, the method 600 is performed in prediction mode by the virtual object selection module 210 as part of the system 100. However, it will be appreciated that other embodiments may practice the steps of method 600 using other components that perform similar functions.

The method 600 begins at step 602. At 602, the display subsystem 330 generates initial display information 332 presenting a virtual object at an initial virtual location, for example initial virtual location 506. The initial display information 332 may include a rendered view of the virtual 3D environment that may be sent to the XR display 104 by the display subsystem 330 for presentation to the user. The virtual object may or may not be visible in the rendered scene, depending on the direction of the user's gaze and/or the presence of other visual elements occluding the virtual object; however, the initial display information 332 includes virtual location information for the virtual object such that the virtual object would be rendered visible to the user at the virtual location assuming an unobstructed line of sight.

At 604, the trajectory data generation subsystem 310 obtains hand movement information 302 from the hand movement sensors 106, as described above with reference to the trajectory data generation subsystem 310 of FIG. 3 and the trajectory comparison graph of FIG. 4.

At 606, the trajectory data generation subsystem 310 obtains head movement information 304 from head movement sensors 108, also as described above.

At 608, the trajectory data generation subsystem 310 processes the hand movement information 302 and head movement information 304 to generate trajectory data 314 as described above with reference to FIG. 3. Step 608 may optionally be broken down into sub-steps 610 through 618. (Optional steps are shown in FIG. 6 in dashed lines.)

At optional sub-step 610, the trajectory data generation subsystem 310 retrieves previous hand movement information 312 from the memory 208 in order to generate a time series of the trajectory data 314, as described above with reference to FIGS. 3 and 4.

At optional sub-step 612, the trajectory data generation subsystem 310 retrieves previous head movement information 312 from the memory 208 in order to generate a time series of the trajectory data 314, also as described above.

At optional sub-step 614, the trajectory data generation subsystem 310 stores the hand movement information 302 obtained from the hand movement sensors 106 in the memory 208 as the previous hand movement information 312, as described above with reference to FIGS. 3 and 4.

At optional sub-step 616, the trajectory data generation subsystem 310 stores the head movement information 304 obtained from the head movement sensors 108 in the memory 208 as the previous head movement information 312, also as described above.

At optional sub-step 618, the trajectory data generation subsystem 310 generates the trajectory data 314 based on the head and hand movement information 302, 304, 312 obtained from the sensors 106, 108 and retrieved from the memory 208, as described above with reference to FIGS. 3 and 4.

After step 608, the method 600 proceeds to step 620. At 620, the intent prediction subsystem 320 processes the trajectory data 314 to determine that the user intends to select the virtual object at the initial virtual location 506. Step 620 may optionally include sub-step 622.

Optionally, at sub-step 622, the intent prediction subsystem 320 compares the trajectory data 314 to a plurality of trajectory templates (e.g., each trajectory template in the library 212) to identify a best-matched trajectory template corresponding to an intent to select the virtual object at the initial location 506. The correspondence between the best-matched trajectory template and the intent to select the virtual object at the initial location 506 is determined by predicting the destination location of the hand 20 (e.g. third position 502) and identifying a virtual object intersected by a ray cast from the destination location of the hand 20 (e.g. along third pointing direction 504), as described above with reference to FIGS. 3 and 4.

At 624, the display subsystem 330 generates updated display information 332 presenting the selected virtual object (i.e. the virtual object identified through the ray casting operation, identified in the selected virtual object data 324) at an updated virtual location (e.g., intermediate virtual location 508) closer to the hand 20 than the initial virtual location 506 is. It will be appreciated that this may mean that the updated virtual location may be closer to the current position of the hand 20 during its incomplete trajectory, or closer to the predicted destination location of the hand 20 (e.g. third position 502).

Example Alternative Embodiments

In addition to the embodiments and examples described above, various alternative embodiments may be used in place of all or part of any of the embodiments described above. Some such alternative examples and embodiments will now be briefly described.

In some embodiments, the head movement information 304 may not be required to perform the trajectory prediction operations of the virtual object selection module 210. Thus, the HMD unit 116 may not include an IMU or the IMU may not be used to provide head movement information 304 to the computing device 200. Instead, the hand trajectory may be tracked and predicted based entirely on the hand movement information 302.

In some embodiments, the selected virtual object may include more than one virtual object, such as a collection of GUI elements grouped together in virtual space, or two or more virtual objects intersected, or nearly intersected, by the ray cast from the predicted destination location of the hand 20. In some cases, the virtual object selection module 210 may be configured to select and move close to the user's hand 20 any grouping of related virtual objects (such as a group of GUI elements). In other embodiments, the intent prediction subsystem 320 may be unable to confidently predict which of two or more virtual objects the user intends to select, and so may select all of the two or more virtual objects and bring them closer to the hand 20 (e.g., the predicted destination location of the hand 20). The two or more virtual objects may be brought close to the hand 20 at the same speed and along the same movement vector (e.g. vector 514) in some embodiments; in other embodiments, the two or more virtual objects may be brought close to the hand 20 such that, when they arrive in or close to the proximity of the hand 20, they are arranged or arrayed to improve the visibility and/or accessibility of the two or more virtual objects. For example, if three virtual objects are selected, they may be moved toward a triangular arrangement near the proximity threshold depth$_{proximity}$ of the hand 20 such that the user may view the three virtual objects clearly and perform a further hand movement to select one of the three virtual objects and bring it into proximity to the hand 20 for direct manipulation. Some embodiments may anchor all of the two or more virtual objects to the hand for interaction; other embodiments may allow the user to select one of the two or more virtual objects, and then send the un-selected virtual objects back to their initial virtual locations.

In such embodiments, the initial display information is configured to control the XR display to present a plurality of virtual objects to the user on the XR display 104, and each virtual object is presented at a respective initial virtual location. The trajectory data 314 is processed by the trajectory data generation subsystem 310 to determine that the user intends to select any one of two or more virtual objects of the plurality of virtual objects. In response to this determination, the updated display information is configured to control the XR display 104 to present the two or more virtual objects to the user on the XR display at a respective two or more updated virtual locations. Each respective updated virtual location is closer to the hand than each respective initial virtual location.

In some embodiments, the virtual object selection module 210 may be configured to track movements of both of the user's hands, for example by using a second hand-mounted IMU coupled to a second hand. The second hand may be used to provide additional input to the operations described herein, such as disambiguation between multiple selected virtual objects as described immediately above.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for presenting a virtual object of an extended reality (XR) environment to a user, comprising:
generating initial display information configured to control an XR display to present the virtual object to the user at an initial virtual location;
obtaining, from one or more hand movement sensors, hand movement information indicating a velocity of the hand;
processing the hand movement information to generate trajectory data;
processing the trajectory data to determine that the user intends to select the virtual object; and
generating updated display information configured to control the XR display to present the virtual object to the user at an updated virtual location closer to the hand than the initial virtual location.

2. The method of claim 1,
further comprising obtaining, from one or more head movement sensors, head movement information indicating a velocity of the head of the user; and
wherein processing the hand movement information to generate the trajectory data comprises processing the hand movement information and the head movement information to generate the trajectory data.

3. The method of claim 2, wherein:
generating the trajectory data comprises:
retrieving previous hand movement information from a memory;
storing the hand movement information obtained from the hand movement sensors in the memory;
retrieving previous head movement information from a memory;
storing the head movement information obtained from the head movement sensors in the memory; and
processing the previous hand movement information, the hand movement information obtained from the hand movement sensors, the previous head movement information, and the head movement information obtained from the head movement sensors to generate the trajectory data.

4. The method of claim 2, wherein:
the hand movement information indicates a linear velocity and an angular velocity of the hand; and
the head movement information indicates a linear velocity and an angular velocity of the head.

5. The method of claim 4, wherein:
the one or more hand movement sensors comprise an inertial measurement unit coupled to the hand; and
the one or more head movement sensors comprise an inertial measurement unit coupled to the head.

6. The method of claim 5, wherein:
the inertial measurement unit coupled to the hand is an inertial measurement unit of a smart watch worn on the wrist of the hand; and
the inertial measurement unit coupled to the head is an inertial measurement unit of a head-mounted display device worn on the head, the head-mounted display device comprising the XR display.

7. The method of claim 2, wherein processing the trajectory data to determine that the user intends to select the virtual object comprises comparing the trajectory data to a plurality of trajectory templates to identify a best-matched trajectory template of the plurality of trajectory templates corresponding to an intent to select the virtual object.

8. The method of claim 1,
further comprising processing the trajectory data to predict a future location of the hand; and
wherein the updated virtual location is closer to the future location of the hand than the initial virtual location is.

9. The method of claim 1, wherein:
the initial display information is configured to control the XR display to present a plurality of virtual objects to the user on the XR display, each virtual object being presented at a respective initial virtual location;
the trajectory data is processed to determine that the user intends to select any one of two or more virtual objects of the plurality of virtual objects; and
the updated display information is configured to control the XR display to present the two or more virtual objects to the user on the XR display at a respective two or more updated virtual locations, each respective updated virtual location being closer to the hand than each respective initial virtual location.

10. A system for presenting a virtual object of an extended reality (XR) environment to a user, comprising:
- a processor device; and
- a memory storing machine-executable instructions thereon which, when executed by the processing device, cause the system to:
  - generate initial display information configured to control an XR display to present the virtual object to the user at an initial virtual location;
  - obtain, from one or more hand movement sensors, hand movement information indicating a velocity of the hand;
  - process the hand movement information to generate trajectory data;
  - process the trajectory data to determine that the user intends to select the virtual object; and
  - generate updated display information configured to control the XR display to present the virtual object to the user at an updated virtual location closer to the hand than the initial virtual location.

11. The system of claim 10, wherein:
the machine-executable instructions, when executed by the processing device, further cause the system to obtain, from one or more head movement sensors, head movement information indicating a velocity of the head of the user; and
processing the hand movement information to generate the trajectory data comprises processing the hand movement information and the head movement information to generate the trajectory data.

12. The system of claim 11, wherein:
generating the trajectory data comprises:
- retrieving previous hand movement information from a memory;
- storing the hand movement information obtained from the hand movement sensors in the memory;
- retrieving previous head movement information from a memory;
- storing the head movement information obtained from the head movement sensors in the memory; and
- processing the previous hand movement information, the hand movement information obtained from the hand movement sensors, the previous head movement information, and the head movement information obtained from the head movement sensors to generate the trajectory data.

13. The system of claim 11, wherein:
the hand movement information indicates a linear velocity and an angular velocity of the hand; and
the head movement information indicates a linear velocity and an angular velocity of the head.

14. The system of claim 13, wherein:
the one or more hand movement sensors comprise an inertial measurement unit coupled to the hand; and
the one or more head movement sensors comprise an inertial measurement unit coupled to the head.

15. The system of claim 14, further comprising a head-mounted display device configured to be worn on the head, comprising the XR display and the inertial measurement unit coupled to the head.

16. The system of claim 15, further comprising a smart watch configured to be worn on the wrist of the hand, comprising the inertial measurement unit coupled to the hand.

17. The method of claim 11, wherein:
the memory further stores a plurality of trajectory templates; and
processing the trajectory data to determine that the user intends to select the virtual object comprises:
- retrieving from the memory the plurality of trajectory templates; and
- comparing the trajectory data to the plurality of trajectory templates to identify a best-matched trajectory template of the plurality of trajectory templates corresponding to an intent to select the virtual object.

18. The system of claim 10, wherein:
the machine-executable instructions, when executed by the processing device, further cause the system to process the trajectory data to predict a future location of the hand; and
the updated virtual location is closer to the future location of the hand than the initial virtual location is.

19. The system of claim 10, wherein:
the initial display information is configured to control the XR display to present a plurality of virtual objects to the user on the XR display, each virtual object being presented at a respective initial virtual location;
the trajectory data is processed to determine that the user intends to select any one of two or more virtual objects of the plurality of virtual objects; and
the updated display information is configured to control the XR display to present the two or more virtual objects to the user on the XR display at a respective two or more updated virtual locations, each respective updated virtual location being closer to the hand than each respective initial virtual location.

20. A non-transitory processor-readable medium having machine-executable instructions stored thereon which, when executed by a processor device of a device, cause the device to:
- generate initial display information configured to control an extended reality (XR) display to present a virtual object of an XR environment to a user at an initial virtual location;
- obtain, from one or more hand movement sensors, hand movement information indicating a velocity of the hand;
- process the hand movement information to generate trajectory data;
- process the trajectory data to determine that the user intends to select the virtual object; and
- generate updated display information configured to control the XR display to present the virtual object to the user at an updated virtual location closer to the hand than the initial virtual location.

* * * * *